(12) United States Patent
Aben et al.

(10) Patent No.: US 10,247,570 B2
(45) Date of Patent: Apr. 2, 2019

(54) DATA ACQUISITION APPARATUS, DATA ACQUISITION SYSTEM AND METHOD OF ACQUIRING DATA

(75) Inventors: Sjoerd Aben, Alkmaar (NL); Erik Thomassen, Amsterdam (NL); Teun De Haas, Utrecht (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 12/736,893

(22) PCT Filed: Nov. 6, 2008

(86) PCT No.: PCT/EP2008/064364
§ 371 (c)(1),
(2), (4) Date: Jan. 25, 2011

(87) PCT Pub. No.: WO2010/051827
PCT Pub. Date: May 14, 2010

(65) Prior Publication Data
US 2011/0131243 A1  Jun. 2, 2011

(51) Int. Cl.
*G06F 17/30* (2006.01)
*G01C 21/36* (2006.01)

(52) U.S. Cl.
CPC ...... *G01C 21/3679* (2013.01); *G01C 21/3611* (2013.01); *G06F 17/3087* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,546,529 A | * | 8/1996 | Bowers | G06F 3/0489 707/E17.141 |
| 6,785,668 B1 | * | 8/2004 | Polo | G06F 17/30395 707/769 |

(Continued)

FOREIGN PATENT DOCUMENTS

| | | |
|---|---|---|
| EP | 1 655 677 A2 | 5/2006 |
| EP | 1655677 A2 | 5/2006 |

(Continued)

OTHER PUBLICATIONS

Tezuka, T. et al., "Temporal and Spatial Attribute Extraction from Web Documents and Time-Specific Regional Web Search System," Web and Wireless Geographical Information Systems, $4^{th}$ International Workshop, pp. 14-25, 2004.

(Continued)

*Primary Examiner* — Shyue Jiunn Hwa

(57) ABSTRACT

A data acquisition apparatus includes a processing resource operably coupled to an input unit and an output unit. The processing resource is arranged to provide an execution environment for supporting a user interface. An enquiry module is provided and supported by the execution environment. In at least one embodiment, the apparatus also includes a communications unit operably coupled to the processing resource for supporting communications over a communications network. The enquiry module is arranged to generate a search query relating to a point of interest and receive search results in response thereto via the communications unit, the enquiry module also being arranged to use the search results to derive data associated with the point of interest.

14 Claims, 10 Drawing Sheets

(56) References Cited

U.S. PATENT DOCUMENTS

| | | | |
|---|---|---|---|
| 7,191,059 B2 | 3/2007 | Asahara | |
| 8,224,766 B2 | 7/2012 | Skibiski et al. | |
| 8,577,911 B1* | 11/2013 | Stepinski | G06F 17/30 707/765 |
| 8,611,919 B2* | 12/2013 | Barnes, Jr. | G06Q 10/1053 455/456.1 |
| 2003/0146854 A1 | 8/2003 | Jones | |
| 2003/0220835 A1* | 11/2003 | Barnes, Jr. | G06Q 10/1053 705/14.36 |
| 2004/0133345 A1* | 7/2004 | Asahara | G01C 21/3453 701/410 |
| 2004/0152471 A1 | 8/2004 | MacDonald et al. | |
| 2004/0243938 A1* | 12/2004 | Weise | G06F 3/0482 715/205 |
| 2005/0004911 A1* | 1/2005 | Goldberg | G06F 17/30398 |
| 2005/0165543 A1 | 7/2005 | Yokota | |
| 2006/0074984 A1* | 4/2006 | Milener | G06F 17/30876 |
| 2006/0129636 A1 | 6/2006 | Matsuura et al. | |
| 2006/0149459 A1 | 7/2006 | Matsuura et al. | |
| 2006/0184541 A1* | 8/2006 | Kim | G01C 21/3682 |
| 2006/0271884 A1* | 11/2006 | Hurst | G06F 17/30643 715/854 |
| 2006/0286987 A1 | 12/2006 | Ryu et al. | |
| 2007/0005242 A1 | 1/2007 | Kato et al. | |
| 2007/0198184 A1 | 8/2007 | Yoshioka et al. | |
| 2008/0046298 A1* | 2/2008 | Ben-Yehuda | G06Q 10/025 705/6 |
| 2008/0201227 A1* | 8/2008 | Bakewell | G06Q 30/0217 705/14.19 |
| 2008/0268876 A1* | 10/2008 | Gelfand | G06Q 30/02 455/457 |
| 2009/0204582 A1* | 8/2009 | Grandhi | G06F 17/3087 |
| 2009/0312946 A1 | 12/2009 | Yoshioka et al. | |

FOREIGN PATENT DOCUMENTS

| | | |
|---|---|---|
| EP | 1669719 A | 6/2006 |
| JP | 2007017175 A | 1/2007 |
| WO | 2008041480 A1 | 4/2008 |
| WO | 2008050711 A1 | 5/2008 |

OTHER PUBLICATIONS

International Search Report.
International Search Report issued Feb. 4, 2010 for International Application No. PCT/EP2008/063559.

* cited by examiner

DATA ACQUISITION APPARATUS, DATA ACQUISITION SYSTEM AND METHOD OF ACQUIRING DATA

FIELD OF THE INVENTION

The present invention relates to a data acquisition apparatus of the type that, for example, proactively obtains data associated with a point of interest. The present invention also relates to a data acquisition system of the type that, for example, proactively obtains data associated with a point of interest for communication to a navigation apparatus. The present invention also relates to a method of acquiring data, the method being of the type that, for example, proactively obtains data in relation to a point of interest.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 930 Traffic model manufactured and supplied by TomTom International B.V., provide a reliable means for enabling users to navigate from one position to another. Such devices are of great utility when the user is not familiar with the route to the destination to which they are navigating.

As indicated above, one or more POIs can be selected by a user of the PND in respect of a journey to be embarked upon or during a journey. To select a POI prior to a commencement of a journey, a user typically negotiates a menu structure of a user interface of the PND in order to select a category of POI desired, for example a supermarket or a petrol station. The application software of the PND then identifies, using locally stored data, a number of POIs of the type selected by the user and presents the identified POIs to the user via the user interface. To assist the user, the application software typically orders the POIs identified by distance from a current location of the PND and indicates an associated distance value adjacent the POI listed. The user can then select one of the POIs identified by the user interface and the application software. In response to selection of one of the POIs, the application software either sets the POI selected as a waypoint or an ultimate destination and the PND then calculates a route either via the POI selected or to the POI selected, as appropriate. Of course, if the user is already en-route and the PND is already providing navigation assistance, the PND, integrates the POI chosen into an existing route calculated, for example by recalculating the existing route to take into account the selection made by the user.

On the whole, this technique works quite well and provides satisfactory results for the user. However, a disadvantage of this technique is that a user, wishing to navigate to or via a given point of interest, can arrive at the given point of interest at a time that is incompatible with operating hours of the given point of interest. For example, it is conceivable that a user being navigated to a restaurant, the restaurant being a selected point of interest, can arrive after the restaurant has closed. Hence, it can be seen that a temporal mismatch can occur between an arrival time and the operating hours of the point of interest. Presently, a centralised telephone enquiry service, where the user of the PND or other individual can place a telephone call and enquire as to operating times of a point of interest, does not exist. The user or another individual is therefore charged with the responsibility of determining the operating hours of the point of interest in other ways. In this respect, guesswork has to be employed or research undertaken into the operating hours, for example by telephoning the point of interest directly or using a research tool, such as an Internet search engine, in order to determine the operating hours, or rely upon memory and use a priori knowledge of the operating hours. Such enquiries can be made prior to departure or whilst en-route, but in both cases the user has to resort to a considerable amount of manual activity in order to obtain the information required from a third party. The user then has to estimate travel time using mental arithmetic, a PND or a website-based service in order to determine an arrival time. Overall, this process is typically time consuming, inconvenient and prone to inaccuracy. Furthermore, telephoning the point of interest relies upon someone being available to respond, and private research is not always successful and reliant upon the searching skills of an individual. Also, a priori knowledge is not always completely accurate and sometimes prone to imperfect recollection. This is particularly the case where a POI has varying opening times that are difficult to track in human memory. Similarly, research results are sometimes prone to error. Additionally, the information required may not be in a language with which the user is familiar.

Of course, the user may simply forget to obtain information relating to operating hours of the POI prior to departure and other portable electronic apparatus, for example a mobile telephone, may not be able to support Internet access and hence post-departure research. In any event, even if the user has wireless Internet access, the user nevertheless has to operate the mobile telephone or other wireless device in order to check the operating hours of the POI and to operate the PND in order to plan a route. Such convoluted activity requires time and effort and is not necessarily attractive to the user.

SUMMARY OF THE INVENTION

According to a first aspect of the present invention, there is provided a data acquisition apparatus comprising: a processing resource operably coupled to an input unit and an output unit, the processing resource being arranged to provide an execution environment for supporting a user interface; an enquiry module supported by the execution environment; and a communications unit operably coupled to the processing resource for supporting communications over a communications network; wherein the enquiry module is arranged to generate a search query relating to a point of interest and receive search results in response thereto via the communications unit, the enquiry module also being arranged to use the search results to derive data associated with the point of interest.

The data associated with the point of interest may be associated with a contact detail, for example a telephone number.

The execution environment may support navigation functionality.

The data associated with the point of interest may be temporal data.

The search query may be formulated as a search engine query.

The enquiry module may be arranged to access content identified in the search results and derive the data from the accessed content.

The enquiry module may comprise a parser arranged to derive at least in part the data associated with the point of interest.

The parser may be arranged to derive the data from the accessed content.

A search result of the search results may identify a web page comprising the content.

The search query may be directed to a web search engine.

The enquiry module may be arranged to analyse a property of a file comprising the content and determine in response to the analysis whether the content is unlikely to comprise the data sought in relation to the point of interest. The property may be a file name.

The parser may be arranged to analyse a page title associated with the web page and determine in response to the analysis whether the content is unlikely to comprise the data sought in relation to the point of interest.

The parser may be arranged to analyse a tag of the web page and determine in response to the analysis whether the content is unlikely to comprise the data sought in relation to the point of interest.

The enquiry module may be arranged to disregard the search result in response to the content being determined as unlikely to comprise the data sought in relation to the point of interest.

The enquiry module may be arranged to disregard a search result associated with the content in response to the content being determined as unlikely to comprise the data sought in relation to the point of interest.

The determination may be made with respect to a keyword.

The enquiry module may be arranged to structure the derived temporal data in accordance with a data structure for subsequent use in relation to a temporal calculation.

The enquiry module may support web searching so as to provide a user with the search results and may receive an identity of a selected search result selected by the user for parsing; the search results may comprise the selected search result.

The execution environment may support a web browser interface; the web browser interface may be arranged to support the web searching.

The apparatus may further comprise a web search module arranged to support the web searching and permit the user to provide a search term to be submitted in order to obtain the search results.

The enquiry module may be arranged to investigate each of a plurality of the search results in order to derive the data sought in relation to the point of interest.

The temporal data may be associated with a period of time constituting a period when the point of interest is open.

The enquiry module may be arranged to access customary temporal information associated with the point of interest and to derive the data sought in relation to the point of interest from the customary temporal information.

The enquiry module may be arranged to analyse location data and associated temporal data in order to verify the data derived in relation to the point of interest.

According to a second aspect of the present invention, there is provided a data acquisition system comprising: a server apparatus comprising the data acquisition apparatus as set forth above in relation to the first aspect of the invention; and a navigation apparatus; wherein the navigation apparatus is arranged to query the server apparatus via the communications network in order to obtain the data sought in relation to the point of interest.

According to a third aspect of the present invention, there is provided a navigation apparatus comprising the data acquisition apparatus as set forth above in relation to the first aspect of the invention.

The navigation apparatus may be a navigation device. The navigation device may be portable.

According to a fourth aspect of the present invention, there is provided a server apparatus comprising the data acquisition apparatus as set forth above in relation to the first aspect of the invention.

The server apparatus may further comprise a database of points of interest; and the enquiry module may be arranged to enrich the database of points of interest by deriving respective data in respect of more than one point of interest in the database of points of interest.

According to a fifth aspect of the present invention, there is provided a method of acquiring data in relation to a point of interest, the method comprising: providing an execution environment for supporting a user interface, the execution environment supporting an enquiry module; the enquiry module generating a search query; communicating the search query relating to a point of interest over a communications network; the enquiry module receiving search results in response thereto via the communications network; and the enquiry module using the search results to derive data associated with a point of interest.

According to a sixth aspect of the present invention, there is provided a computer program element comprising computer program code means to make a computer execute the method as set forth above in relation to the fourth or fifth aspects of the invention.

The computer program element may be embodied on a computer readable medium.

Advantages of these embodiments are set out hereafter, and further details and features of each of these embodiments are defined in the accompanying dependent claims and elsewhere in the following detailed description.

It is thus possible to provide a navigation apparatus, a server apparatus and a method therefor capable of enriching or supplementing POI information so as to be of greater quality than POI information absent of temporal information. POI information of improved accuracy and usefulness is thus provided. Indeed, data is generated that can be used to enable a user to maximise the likelihood of arriving at the point of interest in good time or at least in time. In this respect, the supplemented or enriched POI information can thus be beneficially used to provide the user with an opportunity, using a suitable calculation technique, not to waste time travelling to POIs that are unavailable, inaccessible or no longer in existence. Additionally, the user does not have to remember to check operating hours of the POI as the navigation apparatus ensures that this information is checked. Similarly, when a user is en-route, the user can be warned when arrival at the POI selected will be at a time incompatible with the operating hours of the POI and, optionally, provided with an opportunity to select another POI in the event of a delay being encountered en-route that would result in the initial POI selected not being reached in time. The user can thus be provided with one or more warnings during a journey and/or prior to departure. The apparatus and method thus provide an improved user experience in relation to the navigation apparatus, as well as the possibility of saving the user time and inconvenience.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
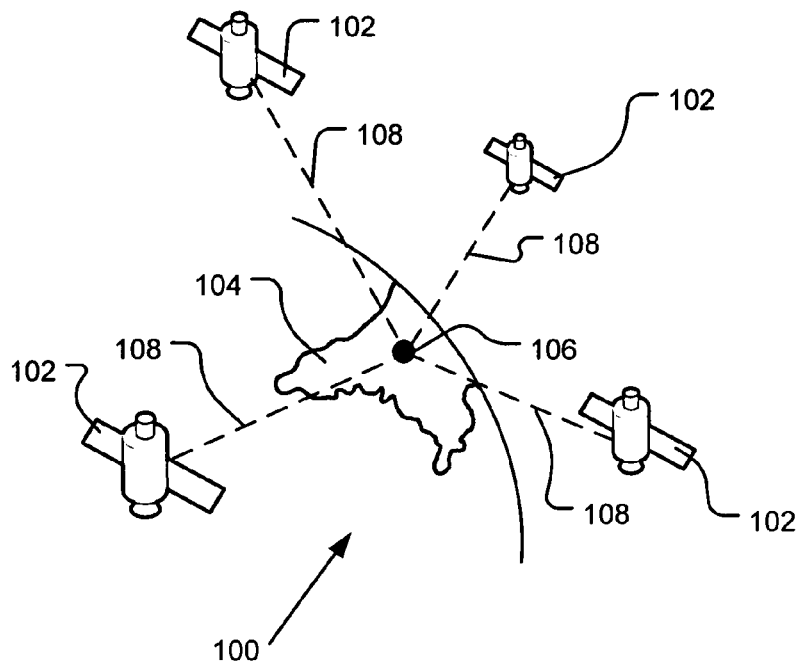
FIG. 1 is a schematic illustration of an exemplary part of a Global Positioning System (GPS) usable by a navigation apparatus.

Throughout the following description identical reference numerals will be used to identify like parts.

Embodiments of the present invention will now be described with particular reference to a PND. It should be remembered, however, that the teachings herein are not limited to PNDs but are instead universally applicable to any type of processing device that is configured to execute navigation software in a portable and/or mobile manner so as to provide route planning and navigation functionality. It follows therefore that in the context of the embodiments set forth herein, a navigation apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It should be appreciated that, in some circumstances, the "destination" location selected by a user need not have a corresponding start location from which the user wishes to start navigating, and as a consequence references herein to the "destination" location or indeed to a "destination" view should not be interpreted to mean that the generation of an initial route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
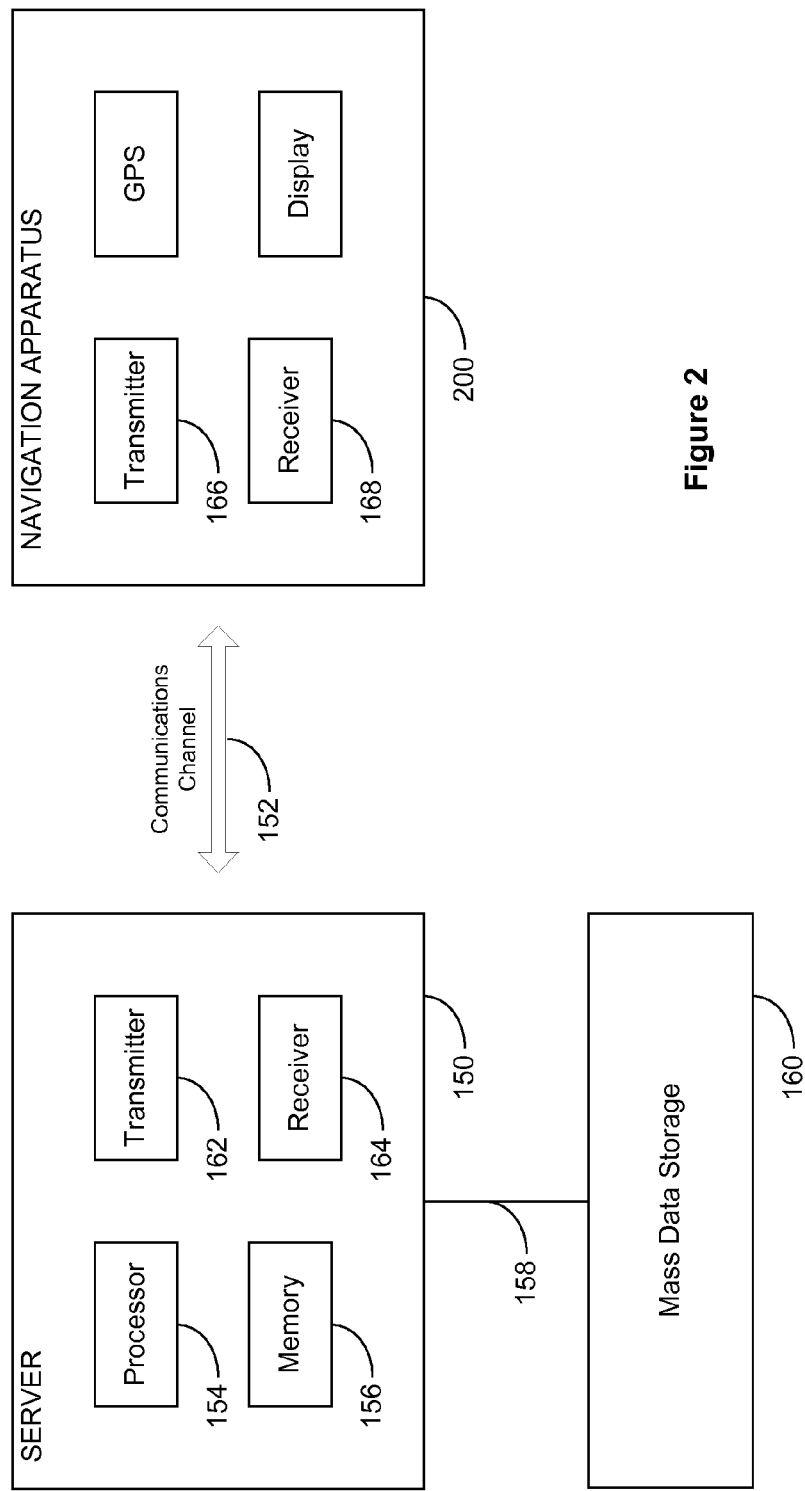
FIG. 2 is a schematic diagram of a communications system for communication between a navigation apparatus and a server apparatus.

In FIG. 2, a navigation system comprises a navigation apparatus 200 capable of communicating, if desired in an embodiment, with a server 150 via a communications channel 152 supported by a communications network, for example a Wide Area Network (WAN), such as the Internet, that can be implemented by any of a number of different arrangements. The communication channel 152 generically represents the propagating medium or path that connects the navigation apparatus 200 and the server 150. The server 150 and the navigation apparatus 200 can communicate when a connection via the communications channel 152 is established between the server 150 and the navigation apparatus 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 is supported by telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

In this example, the navigation apparatus 200 comprising or coupled to the GPS receiver device 106, is capable of establishing a data session, if required, with network hardware of a communications network, for example a "mobile" communications network via a wireless communications terminal (not shown), such as a mobile telephone, PDA, and/or any device equipped with mobile telephone technology, in order to establish a digital connection, for example a digital connection via known Bluetooth technology. Thereafter, through its network service provider, the mobile terminal can establish a network connection (through the Internet for example) with the server 150. As such, a "mobile" network connection can be established between the navigation apparatus 200 (which can be, and often times is, mobile as it travels alone and/or in a vehicle) and the server 150.

In this example, the navigation apparatus 200 is a Bluetooth enabled navigation apparatus in order that the navigation apparatus 200 can be agnostic to the settings of the wireless communications terminal, thereby enabling the navigation apparatus 200 to operate correctly with the ever changing spectrum of mobile telephone models, manufacturers, etc. Model/manufacturer specific settings may, for example, be stored on the navigation apparatus 200.

Although not shown, instead of requiring the wireless communications terminal to provide access to the communications network, the navigation apparatus 200 can, of course, comprise mobile telephone technology, including an antenna, for example, or optionally using an internal antenna of the navigation apparatus 200. The mobile telephone technology within the navigation apparatus 200 can also include an insertable card (e.g. Subscriber Identity Module (SIM) card). As such, mobile telephone technology within the navigation apparatus 200 can similarly establish a network connection between the navigation apparatus 200 and the server 150, via the Internet for example, in a manner similar to that of any wireless communications-enabled terminal.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the Internet connection may be utilised, which can be achieved via a data connection using the mobile telephone or mobile telephone technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation apparatus 200 via the communications channel 152. The signals sent and received may include data, communication, and/or other propagated signals. The transmitter 162 and receiver 164 may be selected or designed according to the communications requirement and communication technology used in the communication design for the navigation 200. Further, it should be noted that the functions of transmitter 162 and receiver 164 may be combined into a single transceiver.

As mentioned above, the navigation apparatus 200 can be arranged to communicate with the server 150 through communications channel 152, using transmitter 166 and receiver 168 to send and receive signals and/or data through the communications channel 152, noting that these devices can further be used to communicate with devices other than the server 150, for example other servers (not shown). Further, the transmitter 166 and receiver 168 constitute a communications unit and are selected or designed according to communication requirements and communication technology used in the communication design for the navigation apparatus 200 and the functions of the transmitter 166 and receiver 168 may be combined into a single transceiver as described above in relation to FIG. 2. Of course, the navigation apparatus 200 comprises other hardware and/or functional parts, which will be described later herein in further detail.

Software stored in server memory 156 provides instructions for the processor 154 and allows the server 150 to provide services to the navigation apparatus 200. One service provided by the server 150 involves processing requests from the navigation apparatus.

The server 150 constitutes a remote source of data accessible by the navigation apparatus 200 via, for example, a wireless channel. The server 150 may include a network server located on a local area network (LAN), wide area network (WAN), virtual private network (VPN), etc. A personal computer may be connected between the navigation apparatus 200 and the server 150 to establish an Internet connection between the server 150 and the navigation apparatus 200.

Figure 3:
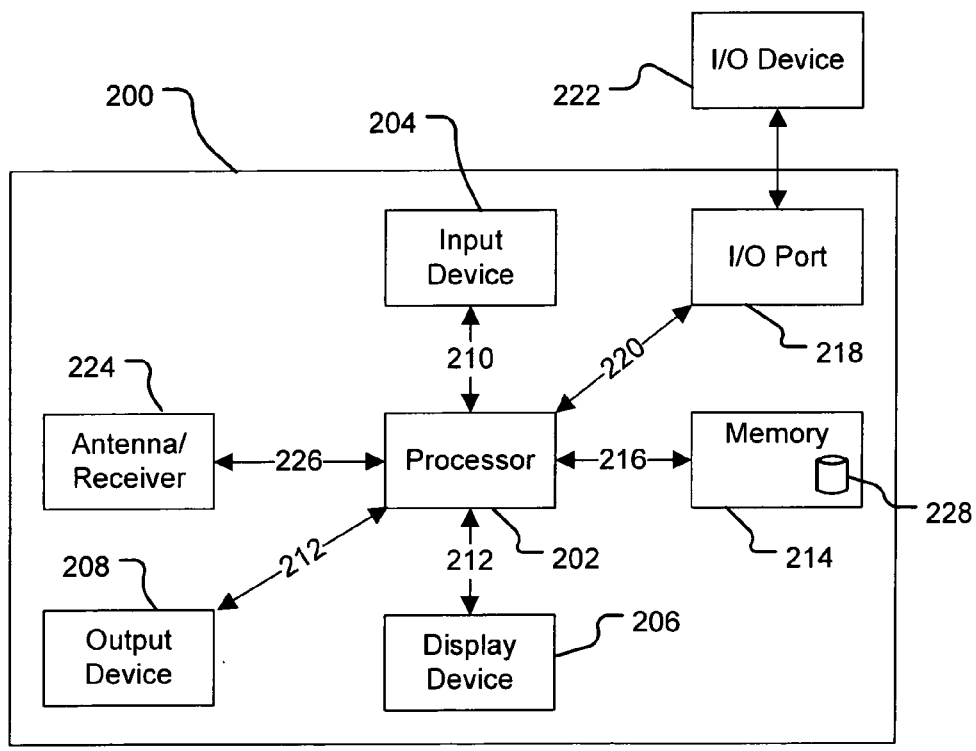
FIG. 3 is a schematic illustration of electronic components of the navigation apparatus of FIG. 2 or any other suitable navigation apparatus.

Referring to FIG. 3, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and the output device 208, via respective output connections 212, to output information thereto. The navigation apparatus 200 may include an output device 208, for example an audible output device (e.g. a loudspeaker). As the output device 208 can produce audible information for a user of the navigation apparatus 200, it is should equally be understood that input device 204 can include a microphone and software for receiving input voice commands as well. Further, the navigation apparatus 200 can also include any additional input device 204 and/or any additional output device, such as audio input/output devices for example. The processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation apparatus 200. The memory resource 230 comprises, for example, a volatile memory, such as a Random Access Memory (RAM) and a non-volatile memory, for example a digital memory, such as a flash memory. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish the data connection between the navigation apparatus 200 and the server 150 via the Internet or any other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation apparatus 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use.

Figure 4:
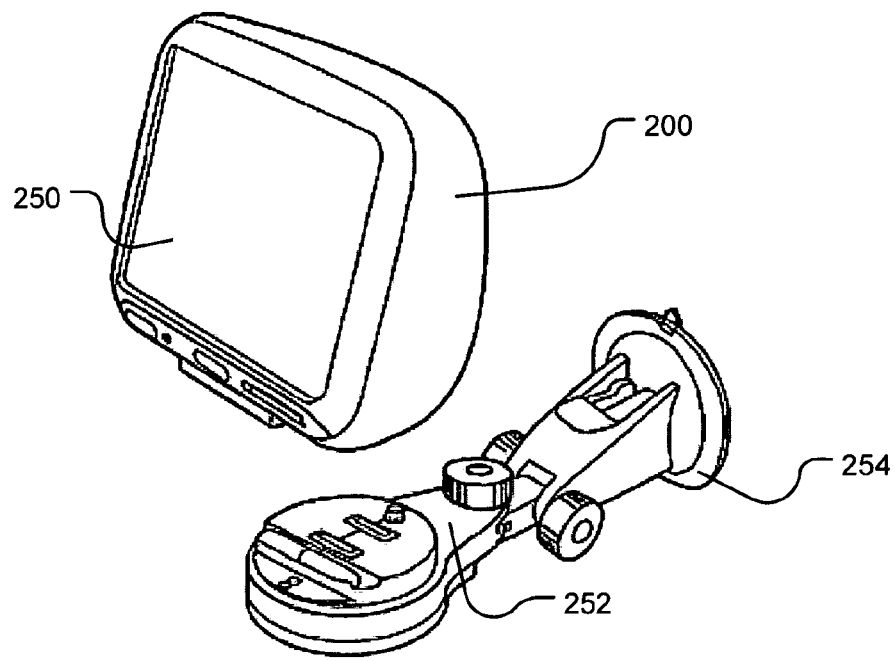
FIG. 4 is a schematic diagram of an arrangement of mounting and/or docking a navigation apparatus.

Referring to FIG. 4, the navigation apparatus 200 may be a unit that includes the integrated input and display device 206 and the other components of FIG. 2 (including, but not limited to, the internal GPS receiver 224, the microprocessor 202, a power supply (not shown), memory systems 214, etc.).

The navigation apparatus 200 may sit on an arm 252, which itself may be secured to a vehicle dashboard/window/ etc. using a suction cup 254. This arm 252 is one example of a docking station to which the navigation apparatus 200 can be docked. The navigation apparatus 200 can be docked or otherwise connected to the arm 252 of the docking station by snap connecting the navigation apparatus 200 to the arm 252 for example. The navigation apparatus 200 may then be rotatable on the arm 252. To release the connection between the navigation apparatus 200 and the docking station, a button (not shown) on the navigation apparatus 200 may be pressed, for example. Other equally suitable arrangements for coupling and decoupling the navigation apparatus 200 to a docking station are well known to persons of ordinary skill in the art.

Figure 5:
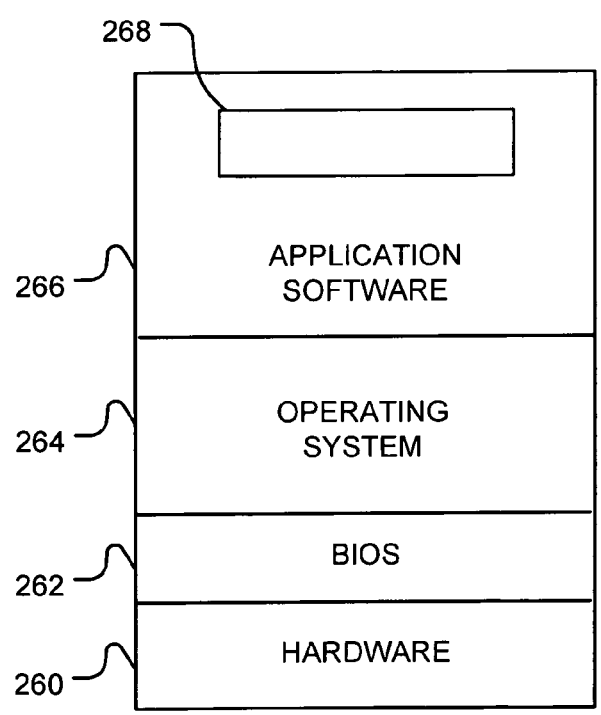
FIG. 5 is a schematic representation of an architectural stack employed by the navigation apparatus of FIG. 3.

Turning to FIG. 5, the memory resource 214 stores a boot loader program (not shown) that his executed by the processor 202 in order to load an operating system 264 from the memory resource 214 for execution by functional hardware components 260, which provides an environment in which application software 266 can run. The application software 266 provides an operational environment including the GUI that supports core functions of the navigation apparatus 200, for example map viewing, route planning, navigation functions and any other functions associated therewith. In this respect, part of the application software 266 comprises a POI information retrieval module 268 constituting an enquiry module. The navigation apparatus 200 supporting the enquiry module also constitutes a data acquisition apparatus.

Figure 6:
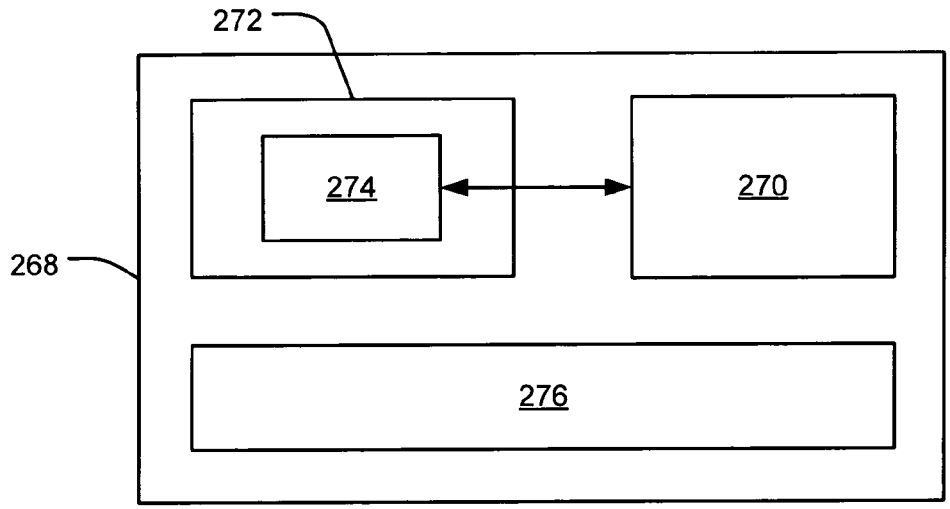
FIG. 6 is a schematic diagram of a module of FIG. 5 in greater detail.

Referring to FIG. 6, the POI information retrieval module 268 comprises a web search module 270 capable of communicating with the server 150. The POI information retrieval module 268 also comprises an analysis module 272 comprising a parser 274, the analysis module 272 being capable of communicating with the web search module 270. The POI information retrieval module 268 further comprises a data verification module 276 capable of accessing the local database of POIs 228 and using the user interface.

Operation of the above navigation apparatus 200 will now be described in the context of a user of the navigation apparatus 200 wishing to travel between two locations in Germany. However, the skilled person should appreciate that other equally applicable examples are conceivable and the choice of locations is not intended to be limiting.

Figure 7:
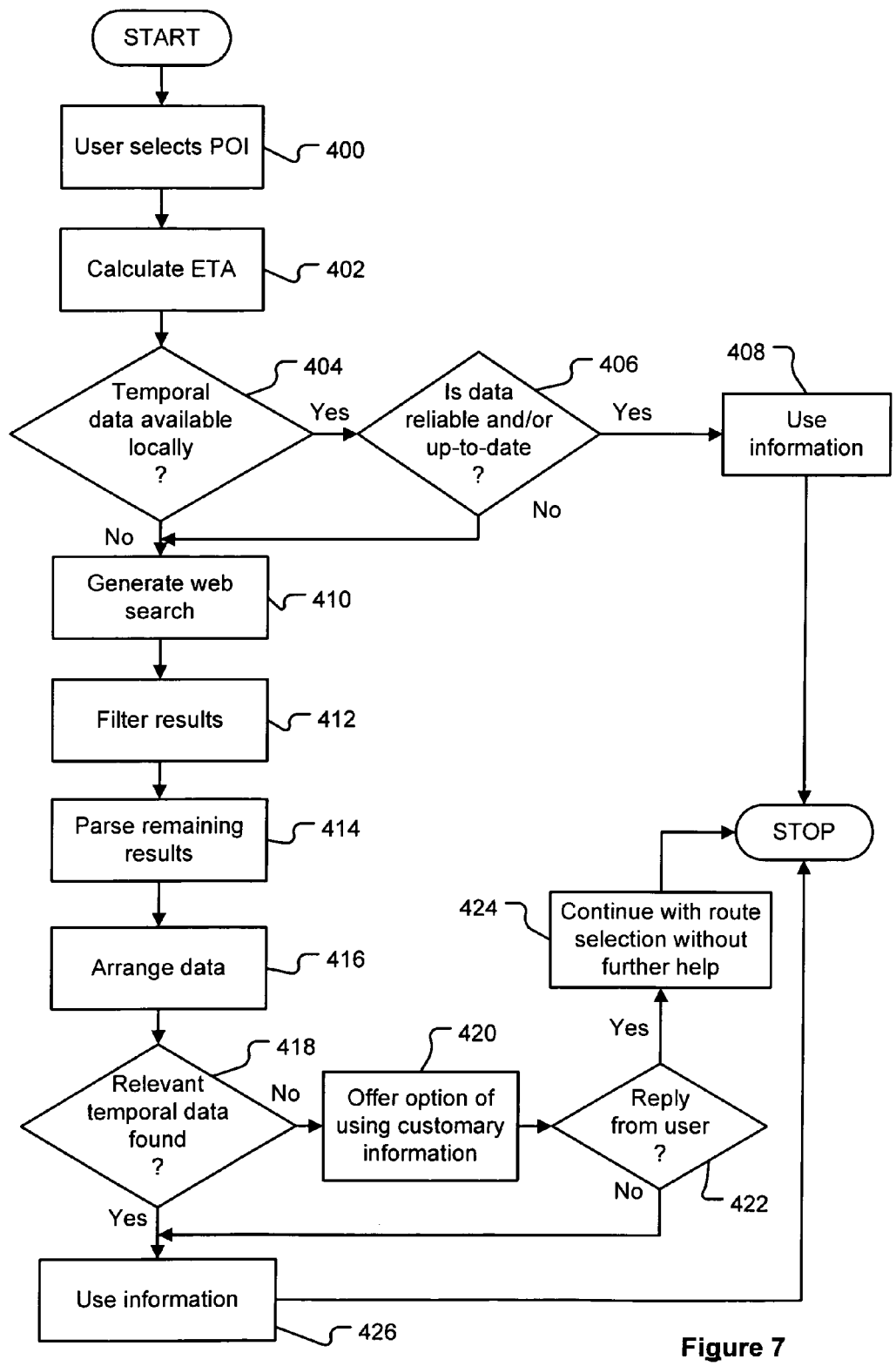
FIG. 7 is flow diagram of a method of providing POI information used by the navigation apparatus of FIGS. 2 and 3 and constituting an embodiment of the invention.

In operation (FIG. 7), the user, a visitor to the offices of the European Patent Office in Munich, Germany, located at Erhardstraβe, 27, requires navigation assistance to a restaurant located in Munich, the name of which is known to the user. The restaurant is an example of a Point of Interest (POI). The POI is recorded in a database of POIs 228 stored by the memory resource 214, constituting a data store. The database of POIs comprises a plurality of POI entries and is organised in accordance with a data structure that supports the recordal of both spatial and temporal information concerning the POIs, the temporal information of a POI entry constituting a temporal data component. Hence, the data structure is arranged to accommodate a name of the POI, coordinates, expressed for example in terms of longitude and latitude, and any temporal characteristics associated with the POI. In addition, in this example, each entry in the database of POIs includes a description for the POI and image data. The data structure can support the inclusion of other information, for example altitude and telephone numbers. Similarly, the data structure need not support storage of all types of data described above. One example data structure is as shown in Table I below:

The temporal characteristics mentioned above are, in this example, hours of business, such as opening times. However, the temporal data need not relate to hours of business and can relate to other operating times, for example periods of availability and/or accessibility. Furthermore, the temporal characteristics can be more sophisticated than a set of hours of business that apply for all weeks in a year, for example some restaurants have weekly and/or seasonally varying opening times, or are even closed during some seasons. The seasonal data can therefore be included in the temporal information recorded in accordance with the data structure. The skilled person should appreciate that recordal of other temporal information can be accommodated by the data structure as will become apparent from other examples described later herein. In this example, whilst the database of POIs 228 comprises the capacity to record temporal information, the database of POIs 228 is incomplete insofar as the temporal information associated with the restaurant sought by the user is not provided. In another example, instead of some entries in the database of POIs 228 lacking corresponding temporal information, the database of POIs 228 can be empty in respect of temporal information and can require enrichment by derivation of the temporal information and subsequent update of the database of POIs 228. This latter example will be described in further detail later herein.

In order to implement navigation to the POI using the navigation apparatus, the user configures a route as follows. Referring also to FIGS. 8 to 15, the user undertakes an illustrative destination location input process (Step 400) described hereinbelow. Although not shown, the user uses a settings menu option supported by the application software 266 in order to select view generation in a three-dimensional mode.

Figure 8:
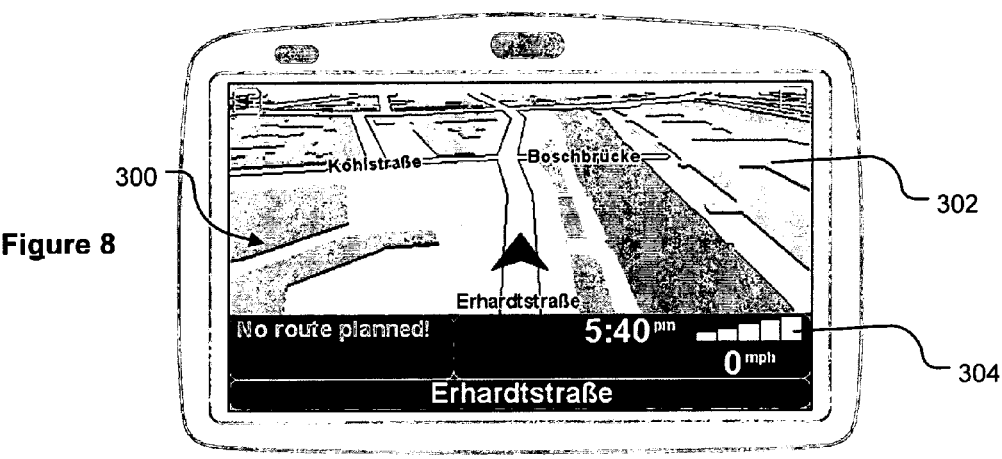
FIGS. 8 to 15 are screen shots from the navigation apparatus during performance of a point of interest selection procedure used in the method of FIG. 7.

When the user switches on the navigation apparatus 200, the apparatus 200 acquires a GPS fix and performs a self-location determination by calculating (in a known manner) the current location of the navigation apparatus 200. The user is then presented, as shown in FIG. 8, with a display 300 showing in pseudo three-dimensions: a local environment 302 in which the navigation apparatus 200 is determined to be located and, in a region 304 of the display 300 below the local environment 302, a set of control and status messages.

Figure 9:
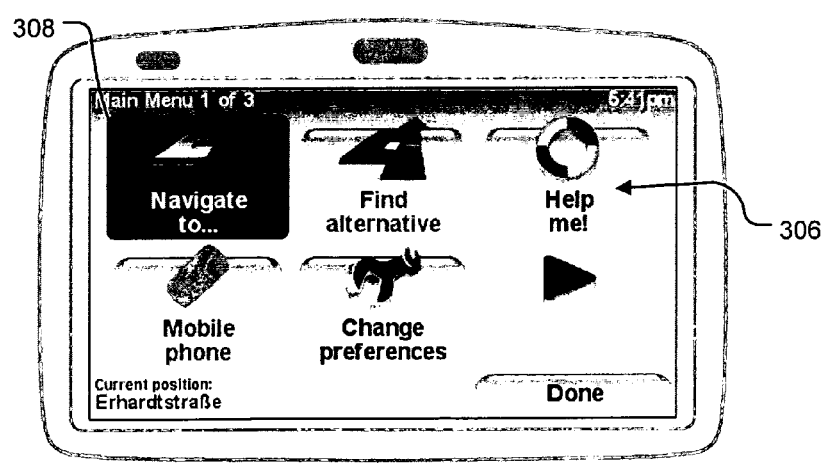

By touching the display at the local environment 302, the navigation apparatus 200 updates the display 300 by displaying (as shown in FIG. 9) a series of virtual or soft buttons 306 by means of which the user can, inter alia, input a destination to which the user wishes to navigate.

Figure 10:
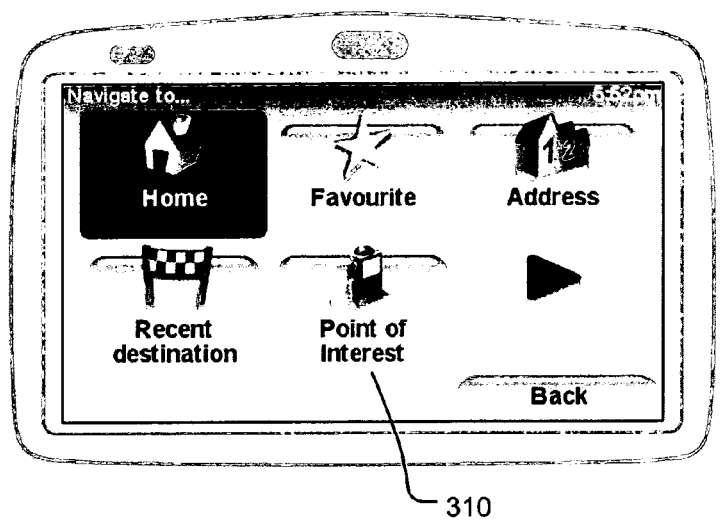

By touching the "Navigate to" virtual button 308, the navigation apparatus 200 switches to display (as shown in FIG. 10) a plurality of virtual buttons as part of a destination selection interface that are each associated with a different category of selectable destinations. In this instance, the display 300 shows a "Home" virtual button that if pressed would set the destination to a stored home location. A "Favourite" virtual button, if pressed, reveals a list of destinations that the user has previously stored in the navigation apparatus 200 and if one of these destinations is then selected the destination for the route to be calculated is set

TABLE I

| Name | Longitude | Latitude | Type | Telephone number | Image | http address | Temporal limit, e.g. closing time | Recurrence, e.g. weekly |
| --- | --- | --- | --- | --- | --- | --- | --- | --- | to the selected previously stored destination. An "Address" virtual button commences a process by which the user can input the street address of the destination to which the user wishes to navigate. A "Recent destination" soft button, if pressed, reveals a list of selectable destinations held in the memory of the navigation apparatus 200 and to which the user has recently navigated. Selection of one of the destinations populating this list would set the destination location for the route to the selected (previously visited) location. A triangular "arrow" shaped virtual button provides access to additional sub-menu options relating to the "Navigate to . . ." menu option. A "Point of interest" virtual button 310, if pressed, reveals a number of options by means of which a user can opt to navigate to any of a plurality of locations, such as Automatic Teller Machines (ATMs), petrol stations or tourist attractions, which have been pre-stored in the navigation apparatus 200 as locations to which the user of the navigation apparatus 200 might want to navigate, as described above.

Figure 11:
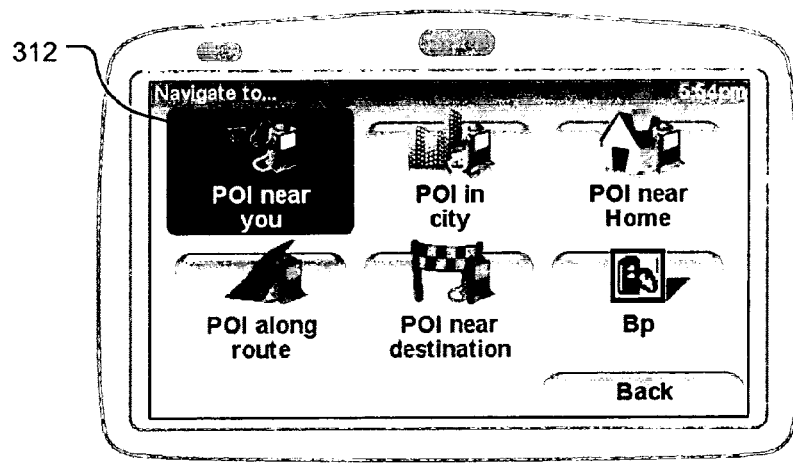

Since the user, in this example, knows the name of the destination to which the user wishes the navigation apparatus 200 to calculate a route, it is assumed that the "Point of Interest" virtual button 310 is operated by touching the button displayed on the touchscreen, whereupon (as shown in FIG. 11) the user is presented with a series of POI options. In particular, the display 300 shows a "POI near you" virtual button 312, a "POI in city" virtual button, a "POI near Home" virtual button, a "POI along route" virtual button, a "POI near destination" virtual button and a quick selection virtual button relating to a recently selected POI, for example a petrol station.

Figure 12:
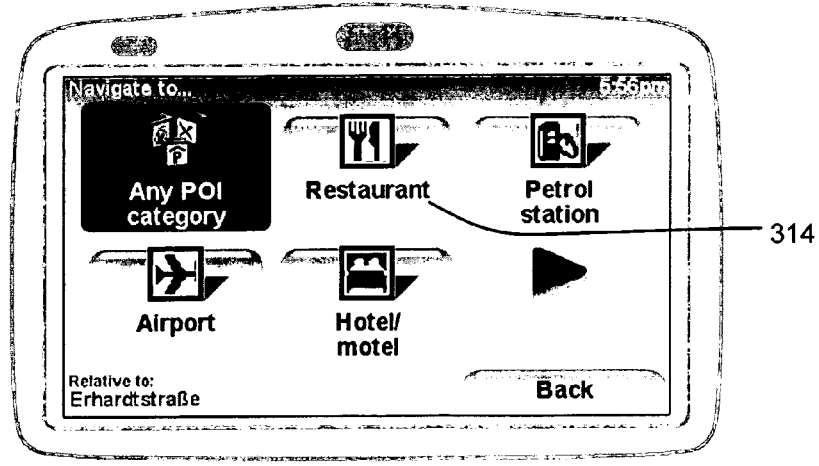
Figure 13:
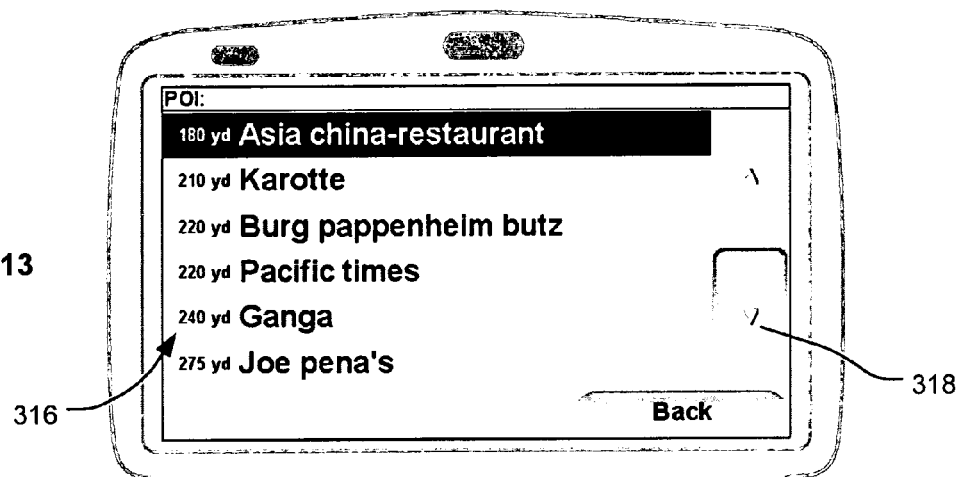
Figure 14:
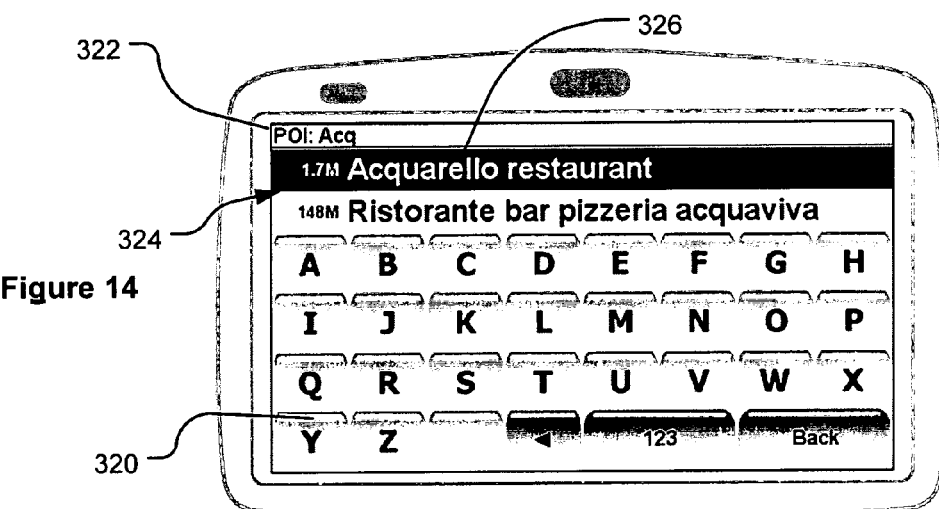

As the user knows that the restaurant is relatively near the current location of the navigation apparatus 200, the user touches the "POI near you" virtual button 312 whereupon the user is then presented, as shown in FIG. 12, with a series of further POI options. In this example, the display 300 is updated to show an "Any POI category" virtual button that permits the user to type a name of a particular POI, as well as specific POI categories using a "Restaurant" POI virtual button 314, a "Petrol Station" POI virtual button, an "Airport" virtual button, and an "Hotel/motel" virtual button. A triangular "arrow" shaped virtual button provides access to a prompt to allow the user to enter a name of a POI category not currently displayed. However, in this example, the user selects the "Restaurant" POI virtual button 314 and the navigation apparatus 200 switches to display (as shown in FIG. 13) a list of restaurants 316, constituting POIs, in the vicinity of the current location of the navigation apparatus 200. After using a scroll virtual button 318 to scroll down the list of restaurants 316 displayed, the user finds that the restaurant sought is not listed and so the user presses a find button (not shown in FIG. 13), whereupon the navigation apparatus 200 updates the display 300 (as shown in FIG. 14) in order to show a virtual keypad 320 and prompts the user, by means of a prompt 322, to enter the name of the POI sought.

Figure 15:
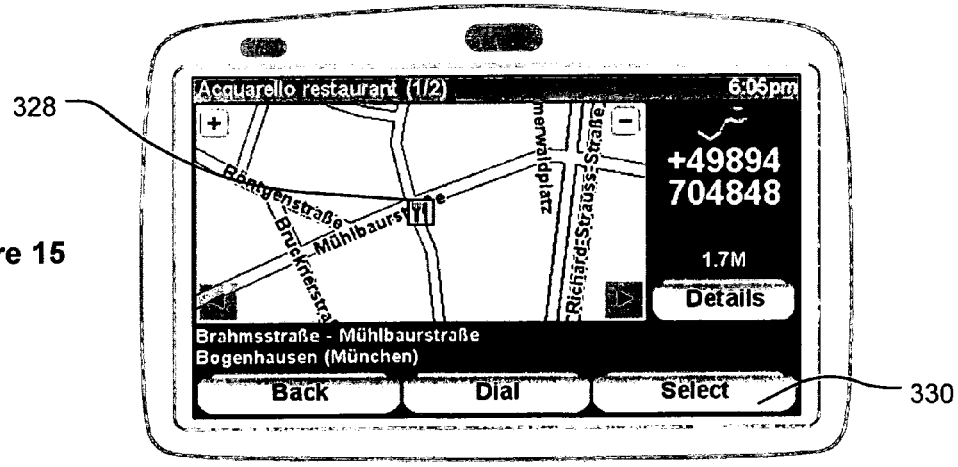

The user therefore begins to type the name of the restaurant, for example the first three letters of the name of the restaurant, using the virtual keypad 320 until the name of the restaurant appears in a results space 324 located between the prompt 322 and the virtual keypad 320. In this example, the user wishes to visit a restaurant called "Acquarello" and the results space 324 contains a results entry 326 entitled "Acquarello restaurant". As this is the restaurant sought by the user, the user selects the restaurant by touching the results entry 326 and the navigation apparatus 200 updates the display 300 (as shown in FIG. 15) in order to show a location 328 of the results entry 326 relative to neighbouring streets, as well as other details relating to the results entry 326, in this example the restaurant called "Acquarello" in Munich. The display 300 also shows a "Back" virtual button, a "Dial" virtual button for where telephone integration support is provided and a "Select" virtual button 330.

In order to display the information mentioned above concerning the results entry 326, the processor 200 accesses the database of POIs 228 and retrieves the POI data relating to the restaurant selected and that is stored in the data store according to the data structure.

As the user believes that the correct POI details have been retrieved, the user confirms selection of the POI by touching the "Select" virtual button 330, whereupon the application software 266 of the navigation apparatus 200 calculates (Step 402) a route between the current location of the navigation apparatus 200 and the selected POI destination. In this example, the processor 202 then calculates a journey time associated with the route calculated, the journey time being estimated. The estimation can involve use of traffic data and any other data available, for example road speed limit data.

The POI information retrieval module 268 then determines (Step 404) whether the local database of POIs 228 comprises temporal information associated with the point of interest selected. In the event that the local database of POIs 228 comprises the temporal information associated with the point of interest selected, the POI information retrieval module 268 determines (Step 406) whether the temporal information held and associated with the point of interest selected is reliable and up-to-date and/or complete. In this respect, reliability can be indicated in the local database of POIs 228 by a rating that is stored against each item of temporal information stored in the database of POIs 228, the rating being generated by a compiler of the local database of POIs 228 from aggregated information obtained from other users and/or information provided in relation to use of the navigation apparatus 200. In relation to the "currentness" of the temporal information stored in relation to the point of interest selected, a date can be stored in respect of the temporal information to permit calculation of the age of the temporal information. If desired, an expiry date can also be employed in relation to the temporal information. In order to store the above-mentioned data, the data structure described herein in relation to the database of POIs 228, of course, needs to be expanded.

In the event that the temporal information is deemed reliable and/or up-to-date, the temporal information can be used (Step 408) by the application software 266 in order to, for example, provide the user with a warning as will be described in more detail later herein. Alternatively, when the temporal information is either unavailable, unreliable and/or not current, the web search module 270 of the POI information retrieval module 268 initiates (Step 410) a web search process, various examples of which are set out below.

In a first example, the application web search module 270 is used to generate a web search query. The web search query is formed in accordance with a syntax used by a web search engine to which the web search query is to be sent. In this example, the web search engine (not shown) to be used is Google, the server 150 constituting an illustrative server used to support the web search engine and is used for the sake of simplicity and clarity of description. The skilled person will, of course, appreciate that other more elaborate implementations are typically employed. The skilled person should also appreciate that other web search engines can additionally or alternatively be employed in order to obtain search results. Where more than one search engine is to be queried, more than one web search query is formed using respective syntax for each of the web search engines to be queried. In this example, only one search engine is being described as being queried for the sake of conciseness and clarity of description.

As mentioned above, the web search module 270 forms the web search query in accordance with the syntax required for submitting a web search query to the Google search engine. Generically, the search terms employed can include: POI type, POI name, city, street name and/or house number or name. In the context of a restaurant, the search terms can be: restaurant type, restaurant name, city, street name and/or house number or name. One example search enquiry therefore employs the following search terms: Italian restaurant, Acquarello, Munich, Mühlbaurstraße 36. In order to guide the web search, indicators can be employed to indentify search terms for which an exact match is required. For example, the above search terms relating to the restaurant Acquarello, can be expressed as follows: "Italian restaurant", +"Acquarello", "Germany", +"Munich", +"Mühlbaurstraße 36", where the "+" character is used to identify search terms for which an exact match is required.

The search query is sent, in this example, using the communications unit of the navigation apparatus 200 via the Internet. The search query is submitted to the server 150 supporting the search engine service. The search engine performs a search in response to receipt of the search query in accordance with any appropriate search technique and search results are sent to the navigation apparatus 200 for receipt of the search results via the communications unit and the Internet.

If too few results are returned by the web search engine, the web search module can modify the search terms used, for example, by reducing the number of search terms used and/or the number of search terms for which an exact match is required. The search query is then re-sent to the search engine in modified form and/or other filtering options supported by the web search engine are used, in order to obtain replacement search results. Similarly, where too many search results are returned, the search terms can be modified in a converse manner to that described above in order to yield fewer search results. Additionally, or alternatively, the search results obtained can be filtered (Step 412) through analysis of one or more aspects associated with the search results.

In this example, the user does not have to be made aware that a search is being performed, though a message advising the user that acquisition of temporal information is taking place and/or asking the user to wait can be provided via the user interface in order to mitigate instances of premature user departure. In any event, the search results returned by the web search engine comprise a number of hyperlinks identifying web pages comprising content. In this example, the content of one or more of the web pages identified comprise the temporal information sought in relation to the point of interest selected as will be described in greater detail later herein. The web search module 270 of the POI information retrieval module 268 therefore accesses each web page, in turn, and analyses one or more aspects or properties of each web page retrieved. For example, the POI information retrieval module 268 analyses a title of a web page downloaded, a file name of a file downloaded and containing data constituting the web page, and/or one or more tags or other identifiers stored in relation to the web page.

In order to analyse the title and/or the file name as mentioned above, the analysis module 272 of the POI information retrieval module 268 examines the file name given to the web page downloaded and/or any tags embedded in the web page in order to find any matches with key terms or words, for example: "opening hours", "contact details", "contact us", "OpeningHours.html", and/or "ContactDetails.html". Where matches for the key terms have been found, the matches are considered as indicative of web pages containing content that is likely to include the temporal information sought in relation to the point of interest or at least part thereof.

In another embodiment, the analysis module 272 can be arranged to cooperate with the web search module 270 in order to analyse other pages of a website comprising the web page. In such an implementation, the analysis module 272 can employ the above-described filtering technique in order to ignore those pages of the website that are unlikely to contain the temporal information sought.

Figure 16:
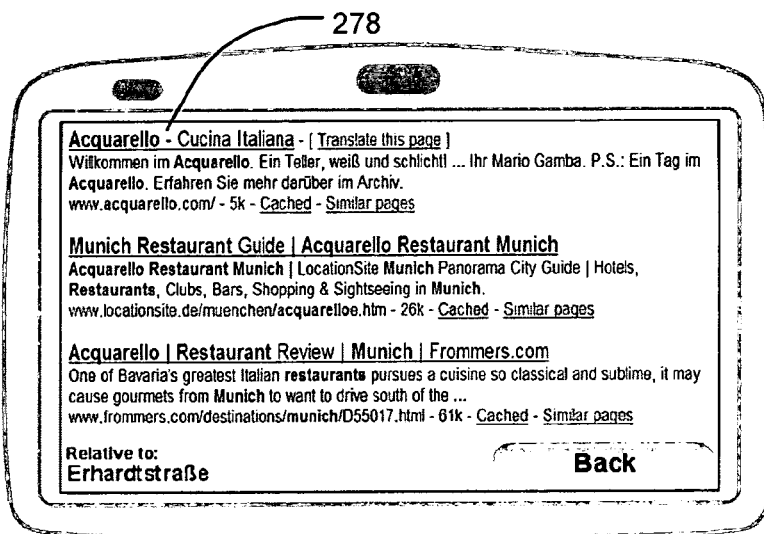
FIG. 16 is a screen shot of a web browser interface used in another embodiment of the invention in relation to the method of FIG. 7.

In a further embodiment (FIG. 16), the application software 266 can support web browser functionality and hence a web browser interface, for example through the web search module 270, in order to present to the user the number of hyperlinks 278 identifying the web pages mentioned above in relation to the search results. The user can then be permitted, using the user interface, to select one of the hyperlinks that the user considers most likely to comprise the temporal information sought. Indeed, if desired, the web browser functionality can enable the user to view the web page and/or even view other pages from the same website in order to verify that the page being viewed comprises the temporal information sought. By providing the user with the option to be involved in the filtering process, the likelihood and speed of obtaining the temporal information sought is increased. Optionally, the web browser functionality can be expanded in relation to the above embodiments to permit the user to enter one or more search terms and/or modify one or more search terms generated by the web search module 270.

In order to identify and extract the temporal information from the web pages identified in the search results and, where appropriate as filtered, it is necessary for the parser 274 of the analysis module 272 to parse (Step 414) the content of the web pages shortlisted by the filtering process mentioned above. Otherwise, if filtering is not performed, the web search module 270 simply accesses, in turn, each web page listed in the search results and the parser 274 parses the content of each web page.

Any suitable content parsing technique can be employed, for example a technique that searches for specific relevant terms in the content, for example times and/or dates and/or days and/or seasons and/or public holidays, in order to derive the temporal information sought. If desired, the parser 274 can analyse content surrounding the terms found in the content in order to ascertain context so as to improve accuracy of recognition of the temporal information or at least part thereof. In this example, the parser 274 searches for the following terms: open, closed, opening hours, business hours, Monday, Mon, Tuesday, Tue, Mon-Fri, Tue through Sat, pm, am, o'clock and/or till. However, the skilled person should appreciate that a greater or fewer number of terms can be used in connection with parsing the content of each web page. In another embodiment, the analysis module 272 can examine the web page in order to identify a structure, for example a table, in the web page that contains at least part of the temporal information sought.

Once temporal information has been identified by the parser 274, the analysis module 272 reconstructs the data extracted in order to generate a structured record of opening times for the point of interest selected, and to store the temporal information in accordance with the data structure supported by the local database of POIs 228. One example of the temporal extracted can comprise the following information as set out in Table I below:

TABLE I

Opening hours
Mon-Friday 9am till 5pm
Sat-Sun Closed
Open on 1st January 2009 from 8 till 8
Closed on Christmas Day In this example, the analysis module 272 processes the above information of Table I in order to yield data in the following form: Monday(9:00 am;5:00 pm), Tuesday(9:00 am;5:00 pm), Wednesday(9:00 am;5:00 pm), Thursday(9:00 am;5:00 pm), Friday(9:00 am;5:00 pm), Saturday(0), Sunday(0), 24/December/2008(0), 01/January/2009(8:00 am;8:00 pm). In some examples, achieving this level of detail can require parsing of multiple web pages. If required, this information can be compressed further. The information derived from the content of one or more web pages is therefore used to populate (Step 416) the data structure of the local database of POIs 228.

Once the temporal information has been derived, the analysis module 272 of the POI information retrieval module 268 then determines (Step 418) whether the temporal information derived comprises temporal information relevant to the journey to be embarked upon by the user in relation to the selected point of interest. In particular in this example, the analysis module 272 determines whether the temporal information derived is relevant to the estimated arrival time calculated above. For example, if the temporal information derived relates to a period of time, such as a season or a day, in which the estimated arrival time does not fall, then the temporal information derived is not relevant. If the temporal information derived does not comprise data relevant to the estimated arrival time of the user at the selected point of interest, the application software 266 of the navigation apparatus 200 offers (Step 420) the user an option of using customary information associated with the type of point of interest selected, if such customary information is available to the navigation apparatus 200 either through locally stored information, or information held by a remote server. In this respect, for some categories of point of interest, for example, fast food restaurants or convenience stores, opening times may customarily be, for example, 24 hours. Similarly, in relation to post offices and banks, the closing times can be known to be 5:00 pm. The customary information can vary depending upon the locality of the point of interest selected, for example country. The application software 266 then awaits (Step 422) a response from the user via the user interface and, if the user declines to accept use of any available customary information or if such customary information is not available, the application software 266 clearly does not possess the necessary temporal information sought in order to perform any added-value calculations in relation to the estimated arrival time of the user at the selected point of interest and so the application software 266 proceeds (Step 424), for example, with the selection of the route initiated above in the hope that the point of interest selected is open for business or not, for example, close to closing when the user arrives at the selected point of interest.

In the present example, the customary information is unavailable, but the temporal information derived comprises information that can be used (Step 426) to perform an added-value calculation mentioned above. Likewise, if the user accepts use by the application software 266 of the customary temporal information available, the application software can perform (Step 426) the added-value calculation mentioned above, but using the customary information. In this respect, one example of the added-value calculation is comparison of the estimated arrival time calculated in respect of the point of interest selected with a closing time of the selected point of interest, the application software 266 providing the user with a visual and/or audible warning in the event that the estimated arrival time exceeds or is too close to the closing time of the selected point of interest. In the event that the user wishes to heed this warning, the application software 266 provides the user with an opportunity to select another POI.

Figure 17:
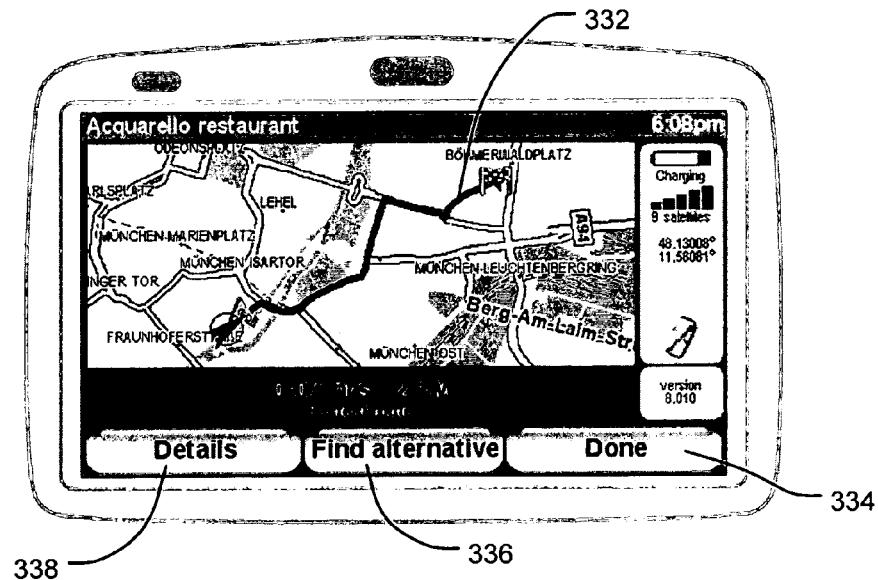
FIGS. 17 to 19 are screen shots from the navigation apparatus during route confirmation and navigation to a destination.

Alternatively, if no warning is provided, the user wishes to ignore any warning or no temporal information can be used by the application software 266 in order to perform the added-value calculation, the process of selection of the POI can be continued. In this respect, the navigation apparatus 200 continues by displaying the calculated route 332, as shown in FIG. 17, on a relatively low magnification map that shows the entire route. The user is also provided with: another "Done" virtual button 334 that the user can press to indicate the calculated route is acceptable, a "Find alternative" button 336 that the user can press to cause the navigation apparatus 200 to calculate another route to the selected destination, and a "Details" button 338 that a user can press to reveal selectable options for the display of more detailed information concerning the currently displayed route 332.

Figure 18:

In this instance, it is assumed that the user considers the displayed route acceptable, and once the "Done" virtual button 334 has been pressed, the user is presented with a three-dimensional view (FIG. 18) of the current, start, location 340 for the navigation apparatus 200.

Once the destination has been set by the user, the user departs from the starting location and the navigation apparatus 200 guides the user, in a known manner, by updating the map in accordance with determined changes in location of the navigation apparatus 200, and by providing the user with visual and, optionally, audible navigation instructions. In this respect, the navigation apparatus 200, via the processor 202 and the GPS receiver 224 constituting a location determination unit, monitors the location of the navigation apparatus 200. Once the navigation apparatus 200 has progressed a sufficient distance along the route planned by the application software 266 of the navigation apparatus 200, it is necessary to update the three-dimensional view displayed by the display device 206, 250. Using longitude and latitude data relating to the location of the navigation apparatus 200, the application software 266 accesses map data and retrieves terrain data, land use data and road data and renders a three-dimensional view using this information. As the details of rendering views is not central to the description of the embodiments herein, for the sake of clarity and conciseness of description further details of the rendering of views will not be described herein.

Figure 19:
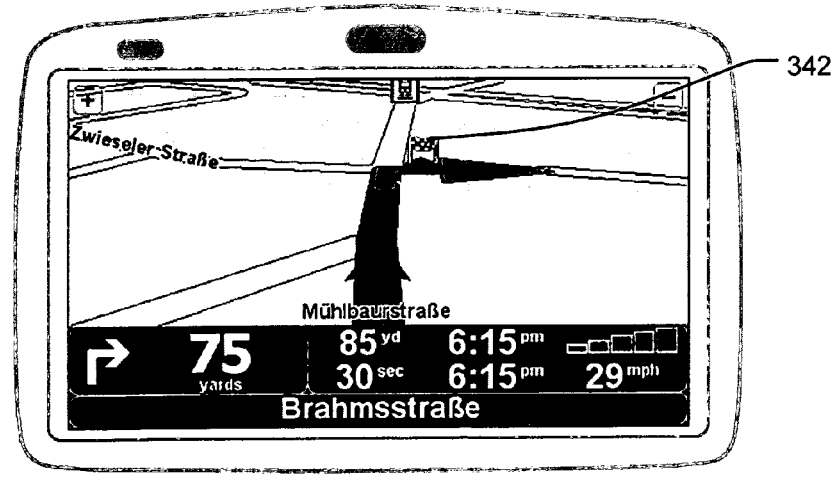

The navigation apparatus 200 continues to provide guidance to the user, and assuming the user follows the instructions provided by the navigation apparatus 200, the navigation apparatus 200 eventually identifies the location of the destination (in this instance: the restaurant "Acquarello") by a chequered flag 342 (FIG. 19).

Figure 20:
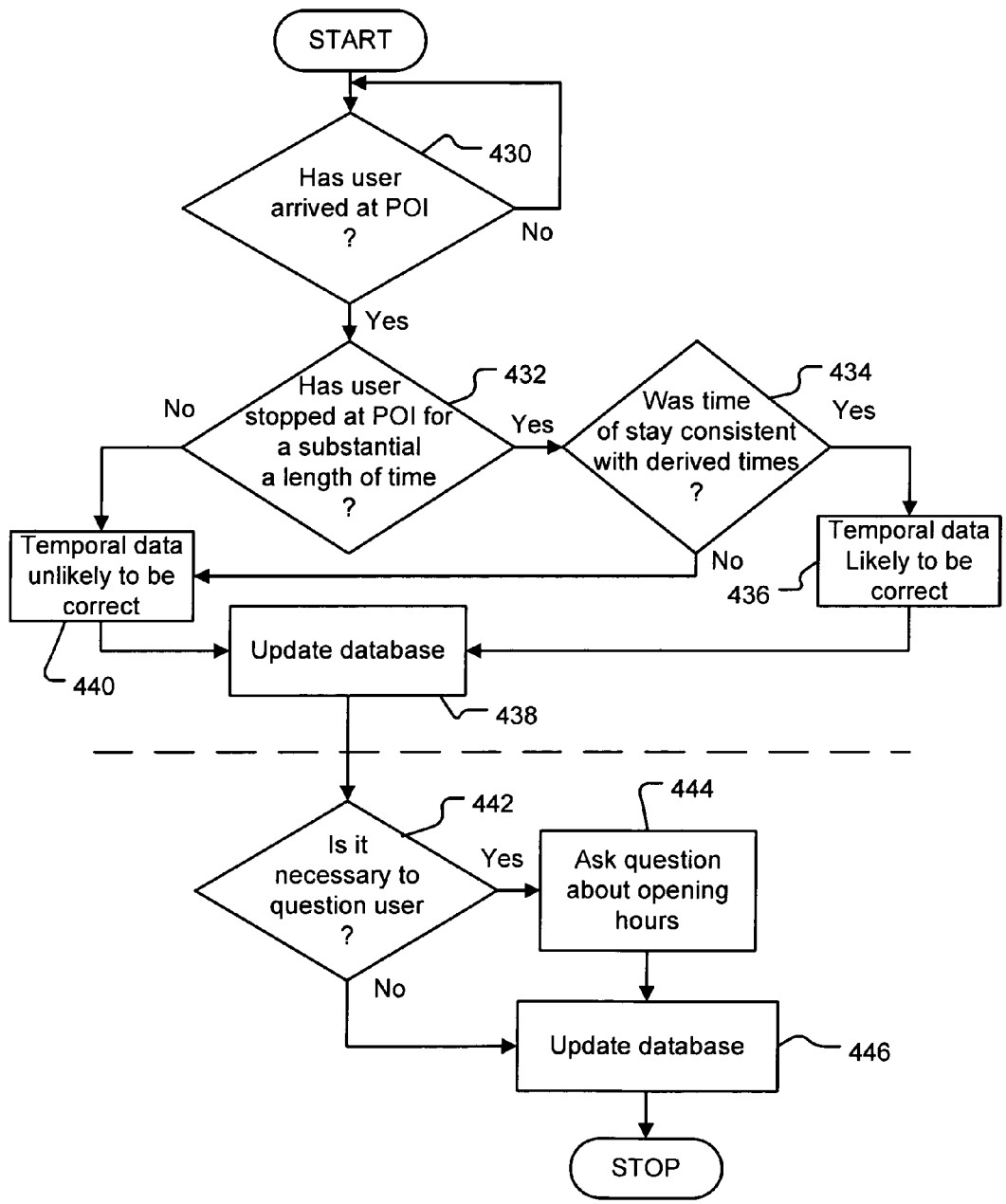
FIG. 20 is a flow diagram of a method of data verification constituting a further embodiment of the invention.

Turning to FIG. 20, the POI information retrieval module 268 is able, if desired, to verify accuracy of the temporal information derived. In this example, the POI information retrieval module 268 performs this task once the user has arrived at the POI selected and/or the destination selected by examining the behaviour of the user (assuming the navigation apparatus 200 follows the user). Consequently, the data verification module 276 of the POI information retrieval module 268 firstly determines (Step 430) whether the user has arrived at the selected point of interest and, if necessary, awaits arrival by the user at the point of interest selected. Once the user has arrived at the selected point of interest, the data verification module 276 monitors a duration of time in respect of which the navigation apparatus 200 remains at the selected point of interest and determines (Step 432) whether the navigation apparatus 200 has remained at, or substantially near, the selected point of interest for a sufficiently substantial length of time. This determination can be made, for example, by comparing the duration of stay with a predetermined time threshold, the duration of the stay can be obtained by recording a length of time that the navigation apparatus 200 resides at, or within a predetermined radius of, a location. In this example, the predetermined time threshold corresponds to a length of time sufficiently substantial to infer that the user had a reason to remain at the selected point of interest. The predetermined time threshold can vary depending upon the category of point of interest. Consequently, if the predetermined time threshold is exceeded, the data verification module 276 then determines (Step 434) whether the duration of time spent at the selected point of interest is consistent with at least part of the derived temporal information, for example within hours of business for a given day. In the event that the duration of time spent at the selected point of interest is consistent with at least part of the derived temporal information, the data verification module 276 concludes (Step 436) that the portion of temporal data derived and used is likely to be correct and the local database of POIs 228 is updated (Step 438) so as to provide a confirmation that the portion of temporal information derived and used has been validated by the navigation apparatus 200. If desired, it can be assumed that if the portion of the derived temporal information used is correct, the rest of the temporal information derived for the point of interest selected is also correct and so the local database of POIs 228 can be updated accordingly. Alternatively, if the duration of time spent at the selected point of interest is not deemed consistent with at least part of the derived temporal information, the data verification module 276 concludes (Step 440) that the temporal information derived is unlikely to be accurate and so the local database of POIs 228 is updated (Step 438) to remove the inaccurate temporal information recorded or to tag the temporal information recorded in the local database of POIs 228 as being, or suspected, inaccurate.

In the event that the duration of time spent at the selected POI is not considered (Step 432) sufficiently substantial to infer that the user had a reason to remain at the selected point of interest, the temporal information derived is also treated (Step 440) as unlikely to be correct and the local database of POIs 228 is updated by tagging the temporal information as being unlikely to be accurate.

User selection of another point of interest shortly after elapse of a predetermined period of time, for example within 5 minutes, 10 minutes or 15 minutes, following arrival at the point of interest selected is another criterion that can be employed in order to infer that the point of interest selected is closed or unavailable.

In this example, the data verification module 276 can also obtain feedback from the user if necessary via the user interface of the navigation apparatus 200 in order to confirm or further confirm accuracy of the temporal information derived or a part thereof in respect of the selected point of interest. In this respect, the data verification module 276 determines (Step 442) whether it is necessary to question the user in connection with the temporal information derived and associated with the POI selected, for example if the temporal information is considered unlikely to be correct. If the data verification module 276 determines that the user should be questioned, the data verification module 276 generates (Step 444), via the user interface of the navigation apparatus 200, a question asking the user if the opening hours are correct or whether the selected point of interest was open when the user arrived at the selected point of interest. The user then provides a response to the question, for example "Yes" or "No" via the user interface of the navigation apparatus 200. In response to the reply provided by the user, the POI information retrieval module 268 updates (Step 446) the local database of POIs 228 with an indication as to whether or not the derived temporal information or a part thereof is accurate or inaccurate. Where the temporal information derived or a part thereof is found by the user to be inaccurate, the data verification module 276 can, alternatively, remove the inaccurate data from the local database of POIs 228. Of course, if the data verification module 276 determines (Step 442) that it was not necessary to question the user, no further action is taken in relation to the temporal information derived.

The above verification tasks can be performed in combination as described above or only one of the tasks can be performed. In relation to the task of obtaining feedback from the user, the feedback does not have to be requested on all occasions and the feedback can be obtained sporadically or following a certain pattern of behaviour in relation to use of the navigation apparatus 200, for example after powering-up the navigation apparatus 200 following powering-down the navigation apparatus 200 in order to go to another point of interest and/or destination. Indeed, the feedback task can be particularly performed or reserved for when inconsistent results are obtained in relation to data verification performed by monitoring behaviour of the user, for example in relation to duration of stay at the point of interest selected (Step 432 above).

The above embodiments have been described in the context of the searching and derivation of the temporal information being performed locally by the navigation apparatus 200. However, a data acquisition system can be provided where the searching can be performed remotely by a remote server (not shown), the navigation apparatus 200 generating and sending a request to the remote server for temporal information associated with the selected POI. In this example, the request generated comprises information necessary to enable the remote server to perform the above described web searching in respect of the selected point of interest. In order to support the derivation of the temporal information, the remote server implements the web searching and derivation functionality described above in relation to the navigation apparatus 200, the remote server having, of course, network access. Following the performance of the search and derivation of the temporal information by the remote server, the remote server returns the temporal information to the navigation apparatus 200 for use and, if required, storage locally. A local copy of any temporal information derived can also be stored by the remote server if desired. Alternative arrangements are made though in relation to verification of any temporal information derived, for example the navigation apparatus 200 can perform the data verification described above and report results of the data verification to the remote server.

In another embodiment, the above-described technique can be used to enrich a POI database as part of a database creation or upgrade process. In this respect, the above-described web searching and temporal information derivation technique can be employed by a server or other computing device. In this respect, the server analyses each POI in the POI database in order to supplement POI information with temporal information concerning the each POI stored in the POI database, where possible. The POI database, once enriched, can be deployed either on a remote server that is queried by navigation apparatus for POI information comprising temporal information associated therewith, or stored locally by a navigation apparatus during manufacture of the navigation apparatus or subsequent download to the device, for example as an update or additional feature.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have largely been described in the context of a process for setting a destination, the above examples can be employed in relation to setting one or more POI whilst en-route and following a route already calculated by the navigation apparatus.

It should be appreciated that although the above examples have been described in the context of a restaurant as a POI, the POI can be any other POI having temporal properties associated therewith, for example municipal locations or public amenities, such as museums, libraries, parks, recycling centres, or commercial establishments, such as shops, bars, public houses (pubs), parking garages and petrol stations.

It should also be appreciated that whilst the above examples have been described in the context of deriving temporal information, the above examples are not limited to the derivation of temporal information and other information can additionally or alternatively be derived in respect of a point of interest, for example a contact detail, such as a telephone number, associated with a point of interest.

Whilst embodiments described in the foregoing detailed description refer to GPS, it should be noted that the navigation apparatus may utilise any kind of position sensing technology as an alternative to (or indeed in addition to) GPS. For example the navigation apparatus may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of acquiring data in relation to a point of interest, comprising:
   generating, by a processor, a search enquiry relating to a point of interest;
   communicating the search query over a communications network;
   receiving search results in response thereto via the communications network, the search results comprising identifiers for web pages that were found by a web search engine based on the search query;
   filtering the search results to eliminate search results that do not have one or more properties matching corresponding criteria, the criteria comprising at least one of tags or identifiers in the content within the web pages associated with the search results and file names associated with the search results;
   using, by the processor, the search results to derive data associated with the point of interest, the deriving comprising processing content within the web pages to acquire the data associated with the point of interest;
   updating information about the point of interest in a point of interest database based at least in part on the data associated with the point of interest, the updating comprising adding, to information describing characteristics of the point of interest, at least one piece of information describing a characteristic of the point of interest that is based on data acquired from the content within the web pages; and
   providing, to other devices, information from the point of interest database, the provided information arranged to be used to perform navigation operations involving the point of interest.

2. The method of claim 1, wherein processing the content in the web pages to acquire the data associated with the point of interest comprises:
   parsing the content to acquire one or more terms, the one or more terms having corresponding arrangements of information.

3. The method of claim 2, further comprising:
   ascertaining context for the one or more terms based at least in part on a portion of the content having a specified locality relationship with the one or more terms within the content.

4. The method of claim 2, wherein parsing the content to acquire the one or more terms comprises:
   identifying, in the content, a specified type of data structure; and
   parsing the data structure to acquire the data associated with the point of interest.

5. The method of claim 1, wherein the data associated with the point of interest is one of:
one or more times when the point of interest is open; and
one or more contact details for the point of interest.

6. A data acquisition apparatus, comprising: a processor and memory arranged to provide an execution environment; and a communications unit operably coupled to the processor for supporting communications over a communications network, wherein the processor is arranged to:
generate a search enquiry relating to a point of interest;
communicate the search query over the communications network;
receive search results in response thereto via the communications network, the search results comprising identifiers for web pages that were found by a web search engine based on the search query;
filter the search results to eliminate search results that do not have one or more properties matching corresponding criteria, the criteria comprising at least one of tags or identifiers in the content within the web pages associated with the search results and file names associated with the search results;
use the search results to derive data associated with the point of interest, the deriving comprising processing content within the web pages to acquire the data associated with the point of interest;
update information about the point of interest in a point of interest database based at least in part on the data associated with the point of interest, the updating comprising adding, to information describing characteristics of the point of interest, at least one piece of information describing a characteristic of the point of interest that is based on data acquired from the content within the web pages; and
providing, to other devices, information from the point of interest database, the provided information arranged to be used to perform navigation operations involving the point of interest.

7. The data acquisition apparatus of claim 6, wherein, when processing the content in the web pages to acquire the data associated with the point of interest, the processor is further arranged to:
parse the content to acquire one or more terms, the one or more terms having corresponding arrangements of information.

8. The data acquisition apparatus of claim 7, the processor is further arranged to:
ascertain context for the one or more terms based at least in part on a portion of the content having a specified locality relationship with the one or more terms within the content.

9. The data acquisition apparatus of claim 7, wherein, when parsing the content to acquire the one or more terms, the processor is further arranged to:
identify, in the content, a specified type of data structure; and
parse the data structure to acquire the data associated with the point of interest.

10. The data acquisition apparatus of claim 6, wherein the data associated with the point of interest is one of:
one or more times when the point of interest is open; and
one or more contact details for the point of interest.

11. A non-transitory computer readable medium comprising computer program code to, when executed by a processor of a data acquisition apparatus, cause the apparatus to execute a method of acquiring data in relation to a point of interest, the method comprising:
generating a search enquiry relating to a point of interest;
communicating the search query over a communications network;
receiving search results in response thereto via the communications network, the search results comprising identifiers for web pages that were found by a web search engine based on the search query;
filtering the search results to eliminate search results that do not have one or more properties matching corresponding criteria, the criteria comprising at least one of tags or identifiers in the content within the web pages associated with the search results and file names associated with the search results;
using the search results to derive data associated with the point of interest, the deriving comprising processing content within the web pages to acquire the data associated with the point of interest;
updating information about the point of interest in a point of interest database based at least in part on the data associated with the point of interest, the updating comprising adding, to information describing characteristics of the point of interest, at least one piece of information describing a characteristic of the point of interest that is based on data acquired from the content within the web pages; and
providing, to other devices, information from the point of interest database, the provided information arranged to be used to perform navigation operations involving the point of interest.

12. The non-transitory computer readable medium of claim 11, wherein processing the content in the web pages to acquire the data associated with the point of interest comprises:
parsing the content to acquire one or more terms, the one or more terms having corresponding arrangements of information.

13. The non-transitory computer readable medium of claim 12, wherein the method further comprises:
ascertaining context for the one or more terms based at least in part on a portion of the content having a specified locality relationship with the one or more terms within the content.

14. The non-transitory computer readable medium of claim 12, wherein parsing the content to acquire the one or more terms comprises:
identifying, in the content, a specified type of data structure; and
parsing the data structure to acquire the data associated with the point of interest.

* * * * *